United States Patent
Brown et al.

(10) Patent No.: US 9,684,183 B2
(45) Date of Patent: Jun. 20, 2017

(54) CONTROL OF AN SMA ACTUATION APPARATUS

(71) Applicant: CAMBRIDGE MECHATRONICS LIMITED, Cambridge, Cambridgeshire (GB)

(72) Inventors: Andrew Benjamin David Brown, Cambridge (GB); Thomas Matthew Gregory, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/442,442

(22) PCT Filed: Nov. 11, 2013

(86) PCT No.: PCT/GB2013/052959
§ 371 (c)(1),
(2) Date: May 13, 2015

(87) PCT Pub. No.: WO2014/076463
PCT Pub. Date: May 22, 2014

(65) Prior Publication Data
US 2016/0209670 A1    Jul. 21, 2016

(30) Foreign Application Priority Data
Nov. 14, 2012   (GB) .................................. 1220485.5

(51) Int. Cl.
*G02B 27/64*   (2006.01)
*F03G 7/06*    (2006.01)
(Continued)

(52) U.S. Cl.
CPC ........... *G02B 27/646* (2013.01); *F03G 7/065* (2013.01); *G03B 3/10* (2013.01); *G03B 5/00* (2013.01);
(Continued)

(58) Field of Classification Search
CPC .. H04N 5/2328; H04N 5/23287; G02B 7/028; G02B 7/181; G02B 27/64;
(Continued)

(56) References Cited

U.S. PATENT DOCUMENTS 4,930,494 A   6/1990   Takehana et al.
4,977,886 A   12/1990  Takehana et al.
(Continued)

FOREIGN PATENT DOCUMENTS

EP   1304872 A1   4/2003
EP   2003489 A2   12/2008
(Continued)

OTHER PUBLICATIONS

Translation of JP 2006-329146.*

*Primary Examiner* — Rochelle-Ann J Blackman
(74) *Attorney, Agent, or Firm* — Harness, Dickey & Pierce, P.L.C.

(57) ABSTRACT

SMA actuator wires in an SMA actuation apparatus are connected in tension between a movable element and a support structure, applying forces to the movable element in opposed directions. Measures of the resistances of the SMA actuator wires are detected. A feedback difference measure is derived being the sum of the measures of resistance of the SMA actuator wires, relatively scaled by factors, in respect of the SMA actuator wires, the magnitude of which represents a component along the predetermined axis of a force applied by the SMA actuator wire and the sign of which represents a direction along the predetermined axis. The
(Continued)

ratio has opposite signs for respective ones of said opposed directions. The powers of drive signals supplied to the SMA actuator wires are controlled in response to the feedback difference measure to reduce the difference between the feedback difference measure and a target difference measure.

23 Claims, 5 Drawing Sheets

(51) Int. Cl.
    *G03B 5/00* (2006.01)
    *G03B 3/10* (2006.01)
    *H04N 5/232* (2006.01)

(52) U.S. Cl.
    CPC ... *H04N 5/2328* (2013.01); *G03B 2205/0076* (2013.01)

(58) Field of Classification Search
    CPC .......... G02B 27/646; G03B 2205/0007; G03B 2205/0015; G03B 2205/0023; G03B 2205/0038
    USPC ................ 396/55; 348/208.99, 208.4, 208.7, 348/208.11; 359/554, 557
    See application file for complete search history.

(56) References Cited

U.S. PATENT DOCUMENTS

| | | |
|---|---|---|
| 5,459,544 A | 10/1995 | Emura |
| 5,763,979 A | 6/1998 | Mukherjee et al. |
| 6,449,434 B1 | 9/2002 | Fuss |
| 6,459,855 B1 | 10/2002 | Kosaka et al. |
| 6,516,146 B1 | 2/2003 | Kosaka |
| 6,554,501 B2 | 4/2003 | Kosaka et al. |
| 6,574,958 B1 | 6/2003 | MacGregor |
| 6,945,045 B2 | 9/2005 | Hara et al. |
| 7,650,752 B2 | 1/2010 | Oohara |
| 2001/0002226 A1 | 5/2001 | Tanaka et al. |
| 2001/0025477 A1 | 10/2001 | Hara et al. |
| 2002/0001467 A1 | 1/2002 | Tanaka et al. |
| 2002/0113499 A1 | 8/2002 | von Behrens et al. |
| 2003/0079472 A1 | 5/2003 | Hara et al. |
| 2005/0275196 A1 | 12/2005 | Zanella et al. |
| 2006/0048511 A1 | 3/2006 | Everson et al. |
| 2006/0150627 A1 | 7/2006 | Oohara |
| 2006/0209195 A1 | 9/2006 | Goto |
| 2006/0266031 A1 | 11/2006 | Kosaka et al. |
| 2006/0272328 A1 | 12/2006 | Hara et al. |
| 2007/0109412 A1 | 5/2007 | Hara |
| 2007/0252011 A1 | 11/2007 | Ferreira et al. |
| 2008/0247748 A1 | 10/2008 | Tanimura et al. |
| 2008/0278030 A1 | 11/2008 | Hara et al. |
| 2008/0278590 A1 | 11/2008 | Tanimura et al. |
| 2009/0009656 A1 | 1/2009 | Honda et al. |
| 2009/0052037 A1 | 2/2009 | Wernersson |
| 2009/0099551 A1 | 4/2009 | Tung et al. |
| 2010/0257859 A1 | 10/2010 | Honda |
| 2010/0320943 A1 | 12/2010 | Honda |
| 2011/0031924 A1 | 2/2011 | Honda |
| 2011/0032628 A1 | 2/2011 | Tanimura et al. |

FOREIGN PATENT DOCUMENTS

| | | |
|---|---|---|
| EP | 2397826 A1 | 12/2011 |
| GB | 2475388 A | 5/2011 |
| JP | A-09-127398 | 5/1997 |
| JP | 2004-198503 A | 7/2004 |
| JP | 2004-279324 A | 10/2004 |
| JP | 2006-329146 A | 12/2006 |
| JP | 2007-315352 A | 12/2007 |
| JP | 2009-086142 A | 4/2009 |
| WO | WO-2005-026539 A2 | 3/2005 |
| WO | WO-2005-075823 A1 | 8/2005 |
| WO | WO-2006-054535 A1 | 5/2006 |
| WO | WO-2006-059098 A1 | 6/2006 |
| WO | WO-2006-105588 A1 | 10/2006 |
| WO | WO-2007-018086 A1 | 2/2007 |
| WO | WO-2007-113478 A1 | 10/2007 |
| WO | WO-2008-099156 A2 | 8/2008 |
| WO | WO-2009-056822 A2 | 5/2009 |
| WO | WO-2009-071898 A2 | 6/2009 |
| WO | WO-2009-090958 A1 | 7/2009 |
| WO | WO-2010-012991 A2 | 2/2010 |
| WO | WO-2010-029316 A2 | 3/2010 |
| WO | WO-2010-049689 A2 | 5/2010 |
| WO | WO-2010-058177 A2 | 5/2010 |
| WO | WO-2010-073902 A1 | 7/2010 |
| WO | WO-2010-089529 A1 | 8/2010 |
| WO | WO-2011-104518 A1 | 9/2011 |
| WO | WO-2012-038703 A2 | 3/2012 |
| WO | WO-2012-066285 A1 | 5/2012 |

* cited by examiner

CONTROL OF AN SMA ACTUATION APPARATUS

CROSS REFERENCE TO RELATED APPLICATIONS

This application is a U.S. National Phase Application under 35 U.S.C. 371 of International Application No. PCT/GB2013/052959 filed on Nov. 11, 2013 and published as WO 2014/076463 A1 on May 22, 2014, which claims priority to British Application No. 1220485.5 filed on Nov. 14, 2012. The entire disclosures of these applications and the publication are incorporated herein by reference.

The present invention relates to the control of SMA (shape memory alloy) actuator wires in an SMA actuation apparatus wherein the SMA actuator wires provide positional control of a movable element relative to a support structure.

There are a variety of types of SMA actuation apparatus in which it is desired to provide positional control of a movable element. In such an apparatus, the SMA actuator wires are connected in tension between a movable element and a support structure. SMA actuator wire is advantageous as an actuator in such an apparatus, in particular due to its high energy density which means that the SMA actuator required to apply a given force is of relatively small size.

One type of apparatus in which SMA actuator wire is known for use as an actuator is a camera, particularly a miniature camera. Some examples are as follows.

WO-2007/113478 discloses an SMA actuation apparatus in which SMA actuator wire is used to drive movement of a camera lens element along the optical axis, for example for the purpose of focussing an image formed by the camera lens element on an image sensor.

WO-2010/029316 and WO-2010/089529 each disclose an SMA actuation apparatus in which SMA actuator wire is used to provide optical image stabilisation (OIS) in a camera by driving tilting of a camera unit including a camera lens element and an image sensor. The tilting is controlled to stabilise the image formed by the camera lens element on an image sensor against vibration, typically caused by user hand movement, that degrades the quality of the image captured by the image sensor.

WO-2011/104518 discloses an SMA actuation apparatus in which SMA actuator wire is used to provide OIS in a camera by driving tilting of a camera unit, but with additional degrees of freedom.

It has previously been disclosed that an SMA actuator wire can be controlled based on a measure of its resistance. Typically, a measure of the resistance of the SMA actuator wire is detected and used as a feedback parameter by controlling the power of the drive signal supplied to the SMA actuator wire to reduce the difference between the measure of resistance and a target resistance. This works well for an apparatus where the SMA actuator wire is operating against a biasing element, such as a spring, and so long as the SMA actuator wire is operated in a region away from the maximum and minimum resistance of the SMA actuator wire, along its resistance versus temperature curve.

Feedback control using a measure of resistance may also be applied to an SMA actuation apparatus wherein the SMA actuator wires are in an arrangement in which the SMA actuator wires apply forces to the movable element in opposed directions. In that case, each SMA actuator wire has a target resistance selected to drive the wire to the desired position. A measure of the resistance of each SMA actuator wire is detected and used as a feedback parameter by controlling the power of the drive signal supplied to the SMA actuator wire to reduce the difference between the measure of resistance and a target resistance.

However, if both SMA actuator wires are controlled independently based on their respective resistances in this way, then there is a risk that power supplied to an individual SMA actuator wire and the resultant temperature of the SMA actuator wire can reach values that may damage the SMA actuator wire.

In addition, the control requires the resistance to decrease as the power delivered to an SMA actuator wire is increased. Accordingly, the control will not work at resistances of the SMA actuator wire near to the maximum and minimum resistance along its resistance versus temperature curve, that are observed as an SMA actuator wire is heated against a constant tension.

According to an aspect of the present invention, there is provided a method of controlling SMA actuator wires in an SMA actuation apparatus wherein the SMA actuator wires are connected in tension between a movable element and a support structure in an arrangement in which the SMA actuator wires apply forces to the movable element in opposed directions, being a method of controlling the SMA actuator wires to drive movement of the movable element relative to the support structure along a predetermined axis, the method comprising:

detecting measures of the resistances of the SMA actuator wires;

deriving a feedback difference measure in respect of the predetermined axis being the sum of the measures of resistance of the SMA actuator wires, scaled relative to each other by factors, in respect of the SMA actuator wires, the magnitude of which represents a component along the predetermined axis of a force applied by the SMA actuator wire to the movable element and the sign of which represents a direction along the predetermined axis in which the SMA actuator wire applies said component of force;

controlling the powers of drive signals supplied to the SMA actuator wires that apply a component of force to the movable element along the predetermined axis in response to the feedback difference measure in a manner that reduces the difference between the feedback difference measure in respect of the predetermined axis and a target difference measure in respect of the predetermined axis.

In the present invention, rather than using a measure of resistance as a feedback parameter, control of movement along a predetermined axis is performed using a feedback difference measure. This is a sum of the measures of resistance of the SMA actuator wires, scaled relative to each other by factors. The factors depend on the direction in which the SMA actuator wires apply force to the movable element relative to the movable element.

The sign of the factors represent a direction along the predetermined axis in which the SMA actuator wire applies a component of force. Thus, the feedback difference measure is effectively a difference measure as between any SMA actuator wires that apply force in one direction along the predetermined axis and any SMA actuator wires that apply force in the opposite direction along the predetermined axis.

The magnitude of the factors represents a component along the predetermined axis of a force applied by the SMA actuator wire to the movable element. This is to take account of the angles in which the SMA actuator wires apply force to the movable element.

In some arrangements, the SMA actuator wires include aligned SMA actuator wires that apply forces to the movable element in opposed directions along the predetermined axis.

In that case, the feedback difference measure in respect of the predetermined axis may be the difference between the total resistance of any aligned SMA actuator wire that applies a force in a first one of said opposed directions and the total resistance of any aligned SMA actuator wire that applies a force in a second one of said opposed directions.

In some arrangements, the SMA actuator wires include non-aligned SMA actuator wires that apply force to the movable element at an acute angle to the predetermined axis. In that case, the factors in respect of such non-aligned SMA actuator wire may have a magnitude less than one relative to the factor for an aligned SMA actuator wire.

The feedback difference measure is used to control the powers of drive signals supplied to the SMA actuator wires that apply a component of force to the movable element along the predetermined axis. The control is performed in response to the feedback difference measure having regard to a target difference measure in respect of the predetermined axis. The control is performed in a manner that reduces the difference between the feedback difference measure in respect of the predetermined axis and a target difference measure in respect of the predetermined axis.

Such feedback control allows the position of the movable element to be controlled without excessive application of power and resultant high temperatures in the SMA actuator wires. This is because the control of position using the feedback difference parameter may be controlled independently of the average power applied. As such, the risk of excessive powers and temperatures that may damage the SMA actuator wire is reduced. Such feedback control similarly allows closed loop control close to the maximum and minimum resistance of the SMA actuator wire, along its resistance versus temperature curve. This increases the stroke of the actuator.

The average power may be kept constant during an actuation operation but may be varied between actuations, for example in response to measure of the ambient temperature. The average power may be controlled to decrease as the ambient temperature increases. Optionally, at relatively high ambient temperatures, the average power may be controlled to decrease by a smaller amount or to remain constant with further ambient temperature increases. These settings provide good operating efficiency and protection against wire damage.

The method of control may be extended to control the SMA actuator wires to drive movement of the movable element relative to the support structure along a further axis orthogonal to the predetermined axis, in addition to said predetermined axis. In this case, the method derives and uses an equivalent feedback difference measure in respect of the further axis that is equivalent to the feedback difference measure in respect of the predetermined axis, being the sum of the measures of resistance of the SMA actuator wires, scaled relative to each other by ratios, in respect of the corresponding SMA actuator wires, of (a) the component of the force applied by the SMA actuator wire to the movable element along the further axis to (b) the total force applied by the SMA actuator wire to the movable element, wherein the ratio has opposite signs for respective ones of said opposed directions.

The present invention may be applied to a range of types of SMA actuation apparatus. In one advantageous application, the SMA actuation apparatus is a camera apparatus further comprising an image sensor fixed to the support structure, and the movable element comprises a camera lens element comprising one or more lenses arranged to focus an image on the image sensor. In that case, the predetermined axis and the further axis both may be orthogonal to the optical axis of the camera lens element, in which case the movement may provide optical image stabilisation (OIS).

According to a further aspect of the present invention, there is provided a control system for an SMA actuation apparatus that implements a similar method.

To allow better understanding, an embodiment of the present invention will now be described by way of non-limitative example with reference to the accompanying drawings, in which.

Each of the hereinafter described embodiments is a camera apparatus that is an example of an SMA actuation apparatus in which the movable element is a lens elements. Each camera apparatus is to be incorporated in a portable electronic device such as a mobile telephone, media player or portable digital assistant. Thus miniaturisation is an important design criterion. Nonetheless, the same type of SMA actuation apparatus may in general be applied to any type of movable element including ones other than a lens element.

Figure 1:
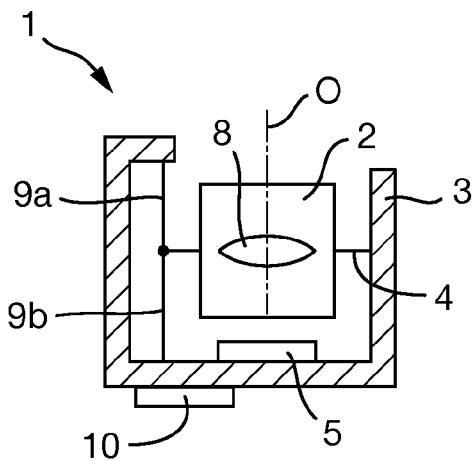
FIG. 1 is a schematic side view of a first camera apparatus.

A first camera apparatus 1 is shown in FIG. 1 in cross-section taken along the optical axis O. The first camera apparatus 1 comprises a lens element 2 supported on a support structure 3 by a suspension system 4 that takes the form of a flexure extending between the lens element 2 and the support structure 3. The suspension system 4 allows movement of the lens element 2 relative to the support structure 3 along the optical axis O. Thus, the lens element 2 is a movable element.

The support structure 3 is a camera support that supports an image sensor 5 arranged along the optical axis O behind the lens element 2. On the rear side of the support structure 3, there is mounted an IC (integrated circuit) chip 10 in which the control system 11 is implemented.

The lens element 2 supports a lens 8 arranged along the optical axis O, although in general any number of lenses may be provided. The first camera apparatus 1 is a miniature camera in which the lens 8 (or the lenses if more than one is provided) has a diameter of at most 10 mm. The lens element 2 is arranged to focus an image onto the image sensor 5. The image sensor 5 captures the image and may be of any suitable type, for example a CCD (charge-coupled device) or a CMOS (complimentary metal-oxide-semiconductor) device. In operation, the lens element 2 is moved along the optical axis O to change the focus and/or magnification.

The first camera apparatus 1 further comprises two SMA actuator wires 9a and 9b each connected in tension between the lens element 2 and the support structure 3. The SMA actuator wires 9a and 9b have an arrangement in which they are each aligned with the optical axis O but opposed to one another so that they apply forces to the lens element 2 in opposed directions (up and down in FIG. 1).

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 9a and 9b causes them to decrease in length. The SMA actuator wires 9a and 9b may be made of any suitable SMA material, for example Nitinol or another Titanium-alloy SMA material. Advantageously, the material composition and pre-treatment of the SMA actuator wires 9a and 9b is chosen to provide phase change over a range of temperature that is above the expected ambient temperature during normal operation and as wide as possible to maximise the degree of positional control.

The two SMA actuator wires 9a and 9b apply forces to the lens element 2 in opposed directions along the optical axis O and therefore apply a stress to each other. On heating of one of the SMA actuator wires 9a and 9b, the stress therein increases and it contracts. This causes movement of the lens element 2. A range of movement occurs as the temperature of the SMA increases over the range of temperature in which there occurs the transition of the SMA material from the Martensite phase to the Austenite phase. Conversely, on cooling of one of the SMA actuator wires 9a and 9b so that the stress therein decreases, it expands under the force from the opposed one of the SMA actuator wires 9a and 9b. This allows the lens element 2 to move in the opposite direction.

As the SMA actuator wires 9a and 9b are each aligned with the optical axis O, movement occurs along the optical axis O which is the predetermined axis in this example. The control of the SMA actuator wires 9a and 9b is effected by the control system 11 shown in FIG. 2 (excluding the components in dotted outline) which generates drive signals for each of the SMA actuator wires 9a and 9b.

The position of the lens element 2 relative to the support structure 3 is controlled by selectively varying the temperature of the SMA actuator wires 9a and 9b using selective drive signals. Heating is provided directly by the drive signals. Cooling is provided by reducing or ceasing the power of the drive signals to allow the SMA actuator wires 9a and 9b to cool by conduction, convection and radiation to its surroundings. The control system 11 has the following arrangement and operation.

Figure 2:
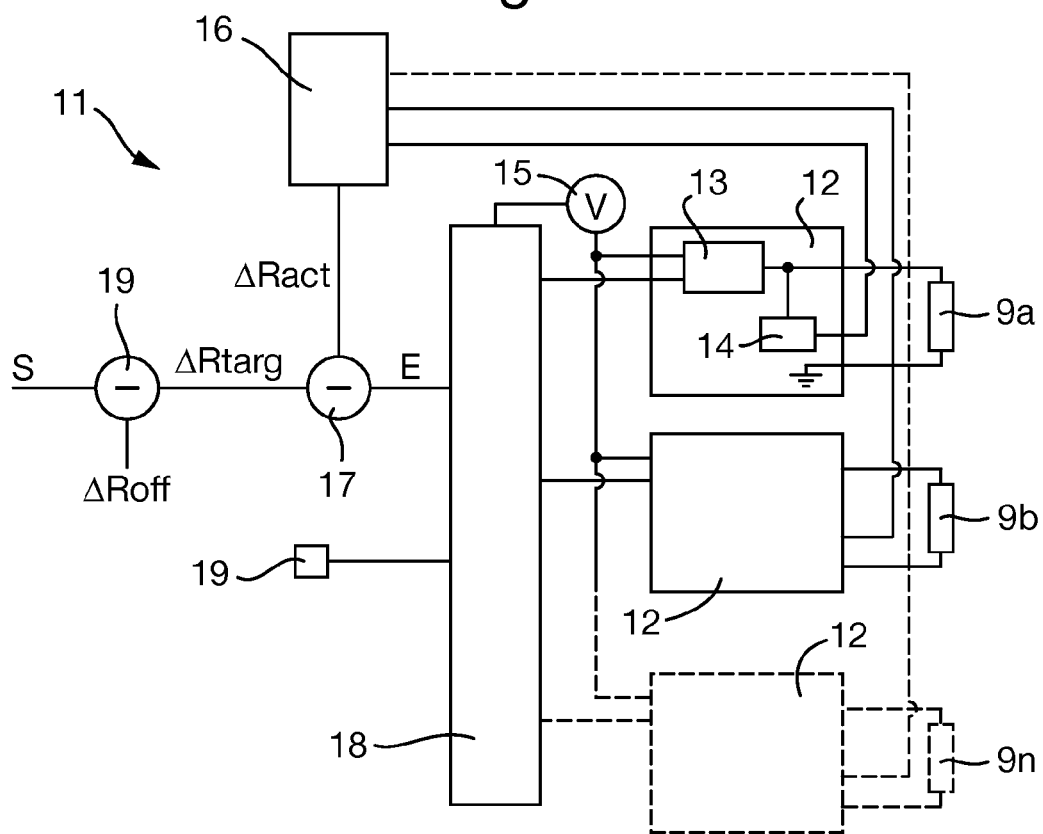
FIG. 2 is a diagram of a control system for the SMA actuator wires of the first camera apparatus.

The control system 11 comprises an SMA circuit 12 connected to each SMA actuator wire 9. Each SMA circuit 12 has the same construction as follows, although for clarity FIG. 2 shows the internal arrangement of only a single one of the SMA circuits.

The SMA circuit 12 comprises a drive circuit 13 and a detection circuit 14 each connected across the SMA actuator wire 9. Thus, each SMA circuit 12 is separately connected to its respective SMA actuator wire 9.

The drive circuit 13 is connected to the SMA actuator wire 9 and supplies a drive signal through the SMA actuator wire 9. The drive circuit 13 may be a constant-voltage current source or a constant-current current source. For example, in the latter case the constant current might be of the order of 120 mA. The drive circuit 13 receives power from a power source 15 that is common to each SMA circuit 12.

The drive signal generated by the drive circuit 13 is a pulse-width modulation (PWM) signal. The PWM duty cycle of the drive signal is varied by the drive circuit 13 to vary the power in accordance with a control signal supplied thereto, as discussed further below.

The detection circuit 14 is connected across the SMA actuator wire 9 and is arranged to detect a measure of the resistance of the SMA actuator wire 9. In the case that the drive circuit 13 is a constant-current current source, the detection circuit 14 may be a voltage detection circuit operable to detect the voltage across the SMA actuator wire 9 which is a measure of the resistance of the SMA actuator wire 9. In the case that the drive circuit 13 is a constant-voltage current source, the detection circuit 13 may be a current detection circuit. For a higher degree of accuracy, the detection circuit 13 may comprise a voltage detection circuit and a current detection circuit operable to detect both the voltage and current across the SMA actuator and to derive a measure of resistance as the ratio thereof.

The measures of resistance of each SMA actuator wire 9a and 9b derived by the detection circuits 14 of each SMA circuit 12 are supplied to a difference measure circuit 16 which derives a feedback difference measure $\Delta Ract$. The feedback difference measure $\Delta Ract$ is the sum of the measures of resistance of each SMA actuator wire 9a and 9b scaled relative to each other by factors. The magnitude of the factors represents the component along the optical axis O of the force applied to the lens element 2. In this example, the SMA actuator wires 9a and 9b are each aligned with the optical axis O so the factors are of equal magnitude. The sign of the factors represents the direction along the optical axis O in which the respective SMA actuator wire 9a or 9b applies said component of force. In this example, the SMA actuator wires 9a and 9b each apply a force to the lens element 2 in opposed directions along the optical axis O and so the factors are of opposite sign. Thus, as a result of the simple arrangement of the first camera 1, in this example the feedback difference measure $\Delta Ract$ is simply the difference of the resistance of the two SMA actuator wires 9a and 9b.

The feedback difference measure $\Delta Ract$ is used as a feedback signal in closed-loop control of the SMA actuator wires 9a and 9b as follows.

A position signal S represents the desired position of the lens element 2 and is supplied to an offset subtractor 19 that subtracts an offset $\Delta Roff$ to derive a target difference measure $\Delta Rtarg$. The offset $\Delta Roff$ has a fixed value and represents a difference between characteristic resistances for the SMA actuator wires 9a and 9b. These characteristic resistances could be measured, calculated or stored on the controller 18. For example, the characteristic resistance of each SMA actuator wire 9a and 9b could be (a) the resistance of the respective SMA actuator wire 9a or 9b when an equal power is applied to all the SMA actuator wires 9a and 9b, (b) a resistance associated with a position at the centre of the range of movement of the lens element 2, or (c) related to the maximum resistance of the SMA actuator wire 9a or 9b when changing length under a fixed tension. The offset $\Delta Roff$ may arise due to differences in the environment of the first camera apparatus 1 or properties of the SMA actuator wires 9a and 9b. The offset $\Delta Roff$ is optional but when used gives improved control where the change in resistance with power applied to a wire approaches zero (i.e. at the maximum resistance or minimum resistance as the power is changed at a fixed tension), because even if the resistance of one of the SMA actuator wires 9a and 9b is invariant with changing power, so long as the resistance of the other of the SMA actuator wires 9a and 9b still varies with applied power, then the difference in the resistances will still vary.

The feedback difference measure ΔRact and the target difference measure ΔRtarg are supplied to an error detector 17 which derives an error signal E representing the difference therebetween.

The error signal E is supplied to a controller 18. The controller 18 may be implemented in a processor. Although the difference measure circuit 16, error detector 17 and controller 18 are illustrated as separate components for ease of understanding, they together constitute a control circuit and may be implemented in a common processor.

The controller 18 generates a control signal for each of the SMA actuator wires 9a and 9b on the basis of the error signal E using a closed-loop control algorithm that reduces the error signal E, i.e. reduces the difference between the feedback difference measure ΔRact and the target difference measure ΔRtarg. The closed-loop control may be proportional, or may include differential and/or integral terms. The controller 18 supplies the control signals to the drive circuits 13 of each SMA circuit 12 where they are used to control the generated drive signals, as discussed above.

Since the feedback control is performed on the basis of the feedback difference measure ΔRact, effectively the tension and temperature of the SMA actuator wires 9a and 9b may be performed independently of the positional control by varying the average power supplied to the SMA actuator wires 9a and 9b. Thus, the control signals for each of the SMA actuator wires 9a and 9b may represent the relative power of the respective drive signal and are selected so as to reduce the error signal E. The drive circuits 13 then supply a drive signal that has a power equal to the average power supplied to each of the SMA actuator wires 9a and 9b multiplied by the relative power represented by the control signal. This has the effect of adjusting the relative amounts by which the powers of the drive signals vary from an average power in accordance with the control signals.

The controller 18 may control the average power by controlling the power source 15 to vary the power supplied to each drive circuit 13. In this way, the controller 18 controls the average power of the drive signals to achieve predetermined tensions in the SMA actuator wires 9a and 9b. The average power may be kept constant during an actuation operation but may be varied between actuations, for example in response to a measure of the ambient temperature. The measure of ambient temperature may be determined by a temperature sensor 19. Alternatively, if the temperature sensor is omitted, the measure of ambient temperature may be a measure of an electrical characteristic of the SMA actuators 9a and 9b that is representative of ambient temperature, for example determined as disclosed in WO 2009/071898.

Typically, the average power is controlled to decrease as the ambient temperature increases, although at relatively high ambient temperatures, the average power is controlled to decrease by a smaller amount or to remain constant with further ambient temperature increases. For example, the average power may be controlled to remain constant above a threshold of say 50° C. These settings provide good operating efficiency and protection against wire damage. In the above example, there are only two SMA actuator wires 9a and 9b, but in general there may be any number n of SMA actuator wires 9a to 9n. In that case, the control system 11 may be modified in straightforward manner as follows. Extra SMA circuits 12 are included for each SMA actuator wire 9n as shown in dotted outline in FIG. 2. The difference measure circuit 16 derives a feedback difference measure ΔRact that is the sum of the measures of resistance of each SMA actuator wire 9a to 9n scaled relative to each other by factors. The magnitude of the factors represents the component along the optical axis O of the force applied to the lens element 2. If all the SMA actuator wires 9a to 9n are aligned with the optical axis O, then the factors are of equal magnitude. The sign of the factors represents the direction along the optical axis O in which the respective SMA actuator wire 9a to 9n applies said component of force. If all the SMA actuator wires 9a to 9n are aligned with the optical axis O, the feedback difference measure ΔRact is the difference between the total resistance of any aligned SMA actuator wire that applies a force in a first one of the directions along the optical axis O and the total resistance of any aligned SMA actuator wire that applies a force in the opposite, second one of the directions along the optical axis.

There will now be described some further camera apparatuses that share many components with the first camera apparatus. Accordingly, common elements are described by common reference numerals, and for brevity a description thereof is not repeated.

Figure 3:
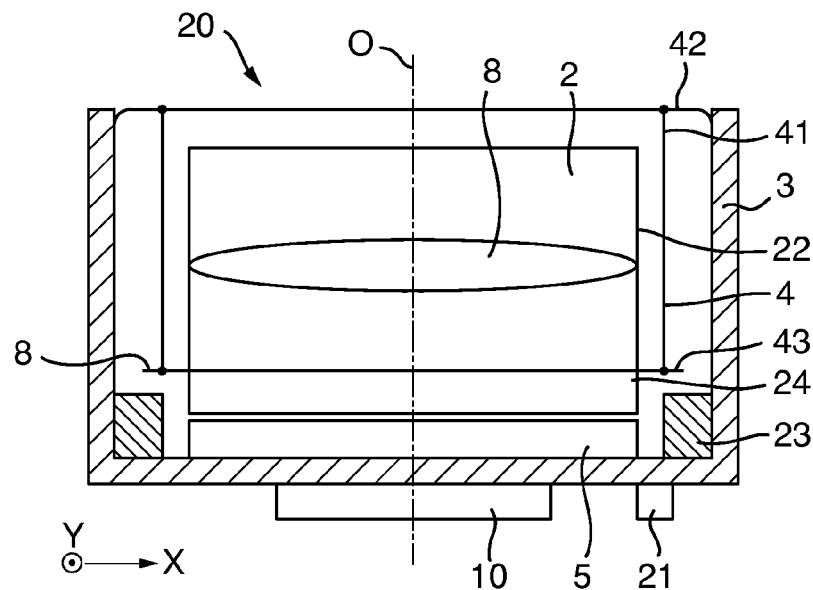
FIG. 3 is a schematic cross-sectional view of a second SMA actuation apparatus that is a camera apparatus.
Figure 4:
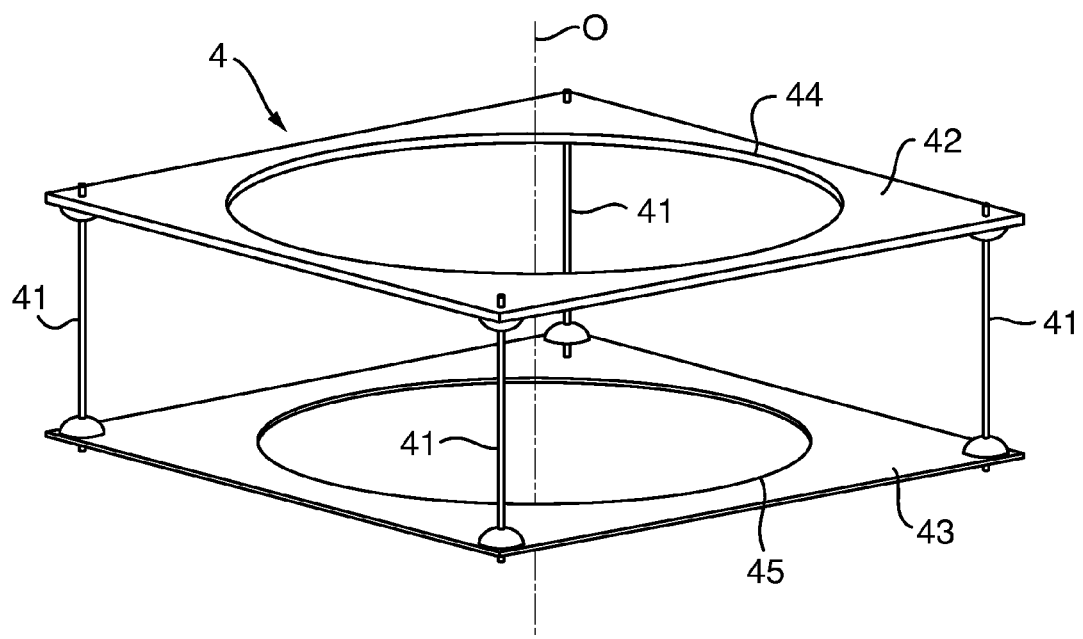
FIG. 4 is a perspective view of the suspension system of the second camera apparatus.

The second camera apparatus 20 is shown in FIGS. 3 to 6. FIG. 3 is a cross-sectional view taken along the optical axis O which is a notional, primary axis. In order to clearly describe the main parts of the first camera apparatus 1, the SMA actuator wires 9 are not shown in FIG. 3, but subsequently described with reference to FIGS. 5 and 6

The second camera apparatus 20 comprises a lens element 2 supported on a support structure 3 by a suspension system 4, described in detail below. The suspension system allows movement of the lens element 2 relative to the support structure 4 in two orthogonal directions each orthogonal to the optical axis O. Thus, the lens element 2 is a movable element.

The support structure 3 is a camera support supporting an image sensor 5 arranged along the optical axis O behind the lens element 2. On the rear side of the support structure 3, there is mounted an IC (integrated circuit) chip 10 in which the control system 11 is implemented, and also a gyroscope sensor 21

The lens element 2 comprises a lens carrier 22 having supported thereon a lens 8 arranged along the optical axis O, although in general any number of lenses may be provided. The second camera apparatus 20 is a miniature camera in which the lens 8 (or the lenses if more than one is provided) has a diameter of at most 10 mm. The lens element 2 is arranged to focus an image onto the image sensor 5.

The lens 8 (or the lenses if more than one is provided) may be fixed relative to the lens carrier 22, or alternatively may be supported to be movable along the optical axis O, for example to provide focussing. Where the lens 8 is movable along the optical axis O, a suitable actuation system (not shown) may be provided, for example using a voice coil motor or SMA actuator wires, such as is described in WO-2007/113478.

In operation, the lens element 2 is moved orthogonally to the optical axis O in two orthogonal directions, shown as X and Y relative to the image sensor 5, both orthogonal to the optical axis O. This has the effect that the image on the image sensor 5 is moved. This movement is used to provide OIS, compensating for image movement of the camera apparatus 1, caused by for example hand shake. This type of OIS may be termed "shift" or "OIS-shift". The resulting image compensation does not entirely reverse the effects of user handshake, but the performance is deemed sufficiently good, given the constraints described above, and in particular allows the size of the camera apparatus 1 to be reduced as compared to an apparatus using tilt.

The suspension system 4 is shown in isolation in FIG. 2 and arranged as follows.

The suspension system 4 comprises four beams 41 connected between a support plate 42 that forms part of the support structure 4 and a lens plate 43 that forms part of the lens element 2 and is connected to the rear end of the lens carrier 22 as shown in FIG. 3. The beams 41 are equally spaced around the optical axis O, one at each corner of the camera apparatus 1. The four beams 41 extend parallel to each other and to the optical axis O, and therefore extend orthogonal to the orthogonal directions in which the lens element 2 moves, although they could extend at a non-perpendicular angle, provided that they are transverse to the orthogonal directions. The beams 41 are fixed to each of the support plate 42 and the lens plate 43 in a manner that the four beams 41 cannot rotate, for example by being soldered.

The beams 41 are positioned inside the support structure 4 and outside the lens carrier 22, the support plate 42 and the lens plate 43 having the same construction including respective apertures 44 and 45 aligned with the optical axis O to accommodate the lens element 2 and allow the passage of light to the image sensor 5.

The beams 41 thereby support the lens element 2 on the support structure 4 in a manner allowing movement of the lens element 2 relative to the support structure 4 in two orthogonal directions orthogonal to the optical axis O simply by means of the beams 41 bending, in particular in an S-shape. Conversely, the beams 41 resist movement along the optical axis O. The beams 41 may have any construction that provides the desired compliance orthogonal to the optical axis O, typically being formed by wires, for example metal wires.

In general, the suspension system 4 could have any alternative construction that allows movement of the lens element 2 relative to the support structure 4 in two orthogonal directions orthogonal to the optical axis O. For example, the suspension system 4 could employ ball bearings or flexures.

Figure 5:
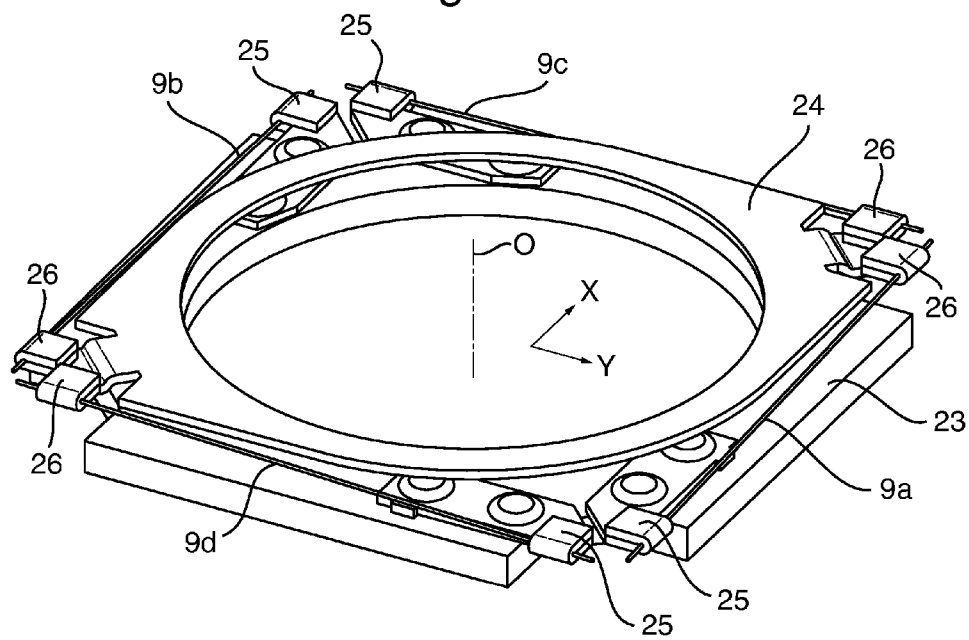
FIG. 5 is a perspective view of the arrangement of SMA actuator wires in the camera apparatus.
Figure 6:
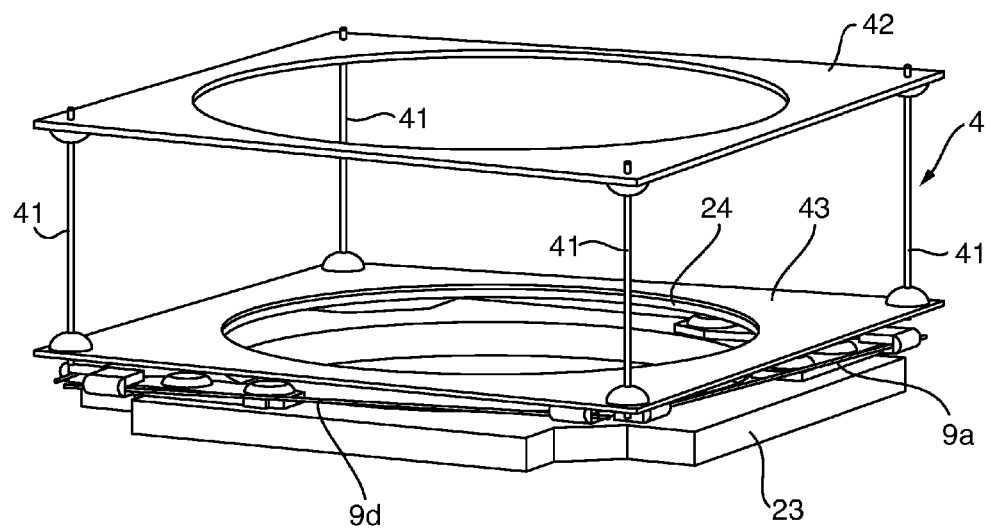
FIG. 6 is a perspective view of the arrangement of the suspension system of FIG. 4 and SMA actuator wires of FIG. 5 together.

The second camera apparatus 20 further comprises a total of four SMA actuator wires 9a to 9d each connected between the lens element 2 and the support structure 3, in particular connected between (i) a support block 23 that forms part of the support structure 4 and (ii) a movable platform 24 that forms part of the lens element 2 and is mounted to the rear of the lens plate 43 as shown in FIGS. 5 and 6. The SMA actuator wires 9a to 9d are connected at one end to the support block 23 by respective crimping members 25 and at the other end to the movable platform 24 by crimping members 26. The crimping members 25 and 26 crimp the wire to hold it mechanically, optionally strengthened by the use of adhesive. The crimping members 25 and 26 also provide an electrical connection to the SMA actuator wires 9a to 9d.

Each of the SMA actuator wires 9a to 9d is connected in tension, thereby applying a force to the lens element 2 and the support structure 3 in a direction orthogonal to the optical axis O. The SMA actuator wires 9a to 9d each extend perpendicular to the optical axis O in a common plane, although this is not essential.

The SMA actuator wires 9a to 9d have an arrangement in which they apply forces to the lens element 2 in opposed directions orthogonal to the optical axis O. As shown in FIG. 5, each of the SMA actuator wires 9a to 9d is arranged along one side of the lens element 2. Thus, a first pair of SMA actuator wires 9a and 9b arranged on opposite sides of the optical axis O apply force on the lens element 2 in opposed directions along a first axis X orthogonal to the optical axis O. A second pair of SMA actuator wires 9c and 9d arranged on opposite sides of the optical axis O apply force on the lens element 2 in opposed directions along a second axis Y orthogonal to the first axis and to the optical axis O. Thus, the first pair of SMA actuator wires 9a and 9b are capable on selective driving of moving the lens element 2 relative to the support structure 4 along the first axis and the second pair of SMA actuator wires 9c and 9d are capable on selective driving of moving the lens element 2 relative to the support structure 4 along the second axis. Movement in other directions may be driven by a combination of actuation of these pairs of the SMA actuator wires 9a to 9d to provide a linear combination of movements along the first and second axes X and Y.

The control of the SMA actuator wires 9a to 9d is effected by the control system 11 which generates drive signals for each of the SMA actuator wires 9a to 9d. Movement is driven along the first axis and the second axis which therefore are the predetermined axis and the further axis in this example.

Figure 7:
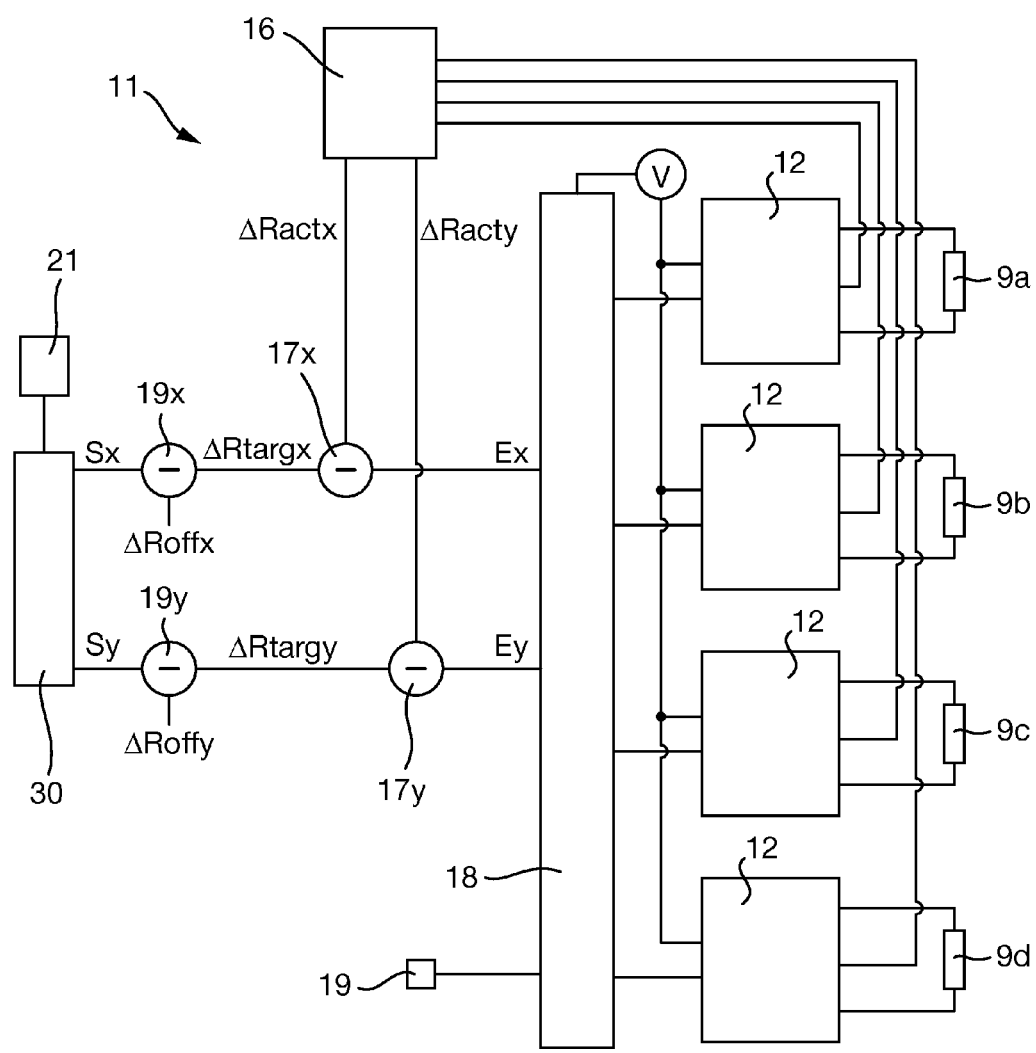
FIG. 7 is a diagram of a control system for the SMA actuator wires of the second camera apparatus.

The control system 11 of the second camera apparatus 20 is the same as the control system 11 of the first camera apparatus 1 as shown in FIG. 2 except for the following modifications that are shown in FIG. 7.

Each one of the SMA actuator wires 9a to 9d is provided with an SMA circuit 12 that is arranged as described above, so that the difference measure circuit 16 is supplied with the measures of resistance of each SMA actuator wire 9a to 9d.

In one alternative, each SMA circuit 12 may be separately connected to its respective SMA actuator wire 9. In another alternative, the SMA actuator wires 9a to 9d have an interconnection at the movable element that electrically connects the group of SMA actuator wires together. In this alternative, the drive circuits 13 and detection circuits 13 of the SMA circuits 12 may be arranged to supply drive signals and to detect measures of resistance in the manner disclosed in WO-2012/066285, for example using the time-division multiplexing techniques disclosed therein.

The remainder of the control system 11 is duplicated for each of the two axes as follows.

The difference measure circuit 16 derives a feedback difference measures ΔRactx and ΔRacty in respect of the two axes X and Y, each being the sum of the measures of resistance of each SMA actuator wire 9a to 9d scaled relative to each other by factors. The magnitude of the factors represents the component along the axis in question of the force applied to the lens element 2, and the sign of the factors represents the direction along that axis in which the respective SMA actuator wire 9a to 9d applies that component of force. As the first pair of SMA actuator wires 9a and 9b are aligned along the first axis X, the feedback difference measure ΔRactx in respect of the first axis X is the difference between the resistances of first pair of SMA actuator wires 9a and 9b. Similarly, as the second pair of SMA actuator wires 9c and 9d are aligned along the second axis Y the feedback difference measure ΔRacty in respect of the second axis Y is the difference between the resistances of second pair of SMA actuator wires 9c and 9d.

The feedback difference measures ΔRactx and ΔRacty in respect of the two axes X and Y are used as feedback signals in closed-loop control of the SMA actuator wires 9a to 9d as follows.

Two position signals Sx and Sy represent the desired position of the lens element 2 in respect of the two axes X and Y. The position signals Sx and Sy are supplied to respective offset subtractors 19a and 19b that subtracts respective offsets ΔRoffx and ΔRoffy to derive target difference measures ΔRtargx and ΔRtargy in respect of the two axes X and Y. The offsets ΔRoffx and ΔRoffy have fixed values in accordance with the same criteria as the offset ΔRoff in FIG. 2.

Two error detectors 17a and 17b are provided. One error detector 17a is supplied with the feedback difference measure ΔRactx and the target difference measure ΔRtargx in respect of the first axis and derives an error signal Ex in respect of the first axis X representing the difference therebetween. The other error detector 17b is supplied with the feedback difference measure ΔRacty and the target difference measure ΔRtargy in respect of the second axis Y and derives an error signal Ey in respect of the second axis Y representing the difference therebetween.

The error signals Ex and Ey are supplied to the controller 18 which generates a control signal for each of the SMA actuator wires 9a to 9d on the basis of the error signals Ex and Ey. The closed-loop control may be proportional, or may include differential and/or integral terms. The controller 18 supplies the control signals to the drive circuits 13 of each SMA circuit 12 where they are used to control the generated drive signals, as discussed above.

The controller 18 generates the control signals using a closed-loop control algorithm that reduces the error signals Ex and Ey. As the first pair of SMA actuator wires 9a and 9b are aligned along the first axis X and the second pair of SMA actuator wires 9c and 9d are aligned along the second axis Y, in this example the control signals applied to the first pair of SMA actuator wires 9a and 9b reduce the error signal Ex in respect of the first axis X and the control signals applied to the second pair of SMA actuator wires 9c and 9d reduce the error signal Ey in respect of the second axis Y.

More generally in other arrangements of SMA actuator wires the control signals in respect of a given SMA actuator wire at an acute angle to each axis may be dependent on both error signals Ex and Ey, in particular including a component derived from each error signal Ex and Ey relatively scaled by factors whose magnitude represents the component of the force applied by the given SMA actuator wire 9 along the respective one of the axes X and Y.

As in the control system of FIG. 2, since the feedback control is performed on the basis of the feedback difference measures ΔRactx and ΔRacty, effectively the tension and temperature of the SMA actuator wires 9a to 9d may be performed independently of the positional control by varying the average power supplied to the SMA actuator wires 9a to 9d. Thus, the control signals for each of the SMA actuator wires 9a to 9d may represent the relative power of the respective drive signal and are selected so as to reduce the error signal E. The drive circuits 13 then supply a drive signal that has a power equal to the average power supplied to each of the SMA actuator wires 9a to 9d multiplied by the relative power represented by the control signal. This has the effect of adjusting the relative amounts by which the powers of the drive signals vary from an average power in accordance with the control signals.

The controller 18 may control the average power by controlling the power source 15 to vary the power supplied to each drive circuit 13. In this way, the controller 18 controls the average power of the drive signals to achieve predetermined tensions in the SMA actuator wires 9a to 9d.

In the arrangement of FIG. 5, the rotation of the module can be controlled by controlling the average power of the first pair of wires 9a and 9b as compared to the average power of the second pair of wires 9c and 9d. The first and second average powers may be different if for example the suspension system has a tendency to rotate the module in one sense or the other. In general, in the absence of external factors the same average power applied to both pairs of wires allows rotations to cancel out.

In this example, the movement of the lens element 2 is arranged to provide OIS using the following components that also form part of the control system 11.

The gyroscope sensor 21 outputs signals representative of the angular velocity of the lens element 2, thereby acting as a vibration sensor that detects the vibrations that the camera apparatus 1 is experiencing. The gyroscope sensor 21 is typically a pair of miniature gyroscopes, for detecting vibration around two axes perpendicular to each other and the optical axis O, although in general larger numbers of gyroscopes or other types of vibration sensor could be used.

The output signals from the gyroscope sensor 21 are supplied to an OIS controller 30 that may be implemented in a processor, being the same or different processor from the controller 18. The OIS controller 21 derives the position signals Sx and Sy that represent the position of the lens element 2 needed to compensate for the movement of the second camera apparatus 20 as a whole, and therefore stabilise the image sensed by the image sensor 5. As the gyroscope sensor 21 is mounted on the support structure 3, the output signals are representative of the vibration of the support structure 3. OIS is effected by moving the lens element 2 laterally in opposition. Accordingly, the OIS controller 21 generates the position signals Sx and Sy providing a desired movement which is opposite to the actual tilt as measured by the gyroscope sensor 21. The OIS controller 30 may process the output signals from the gyroscope sensor 21, for example by filtering them, prior to generating the position signals Sx and Sy.

Figure 8:
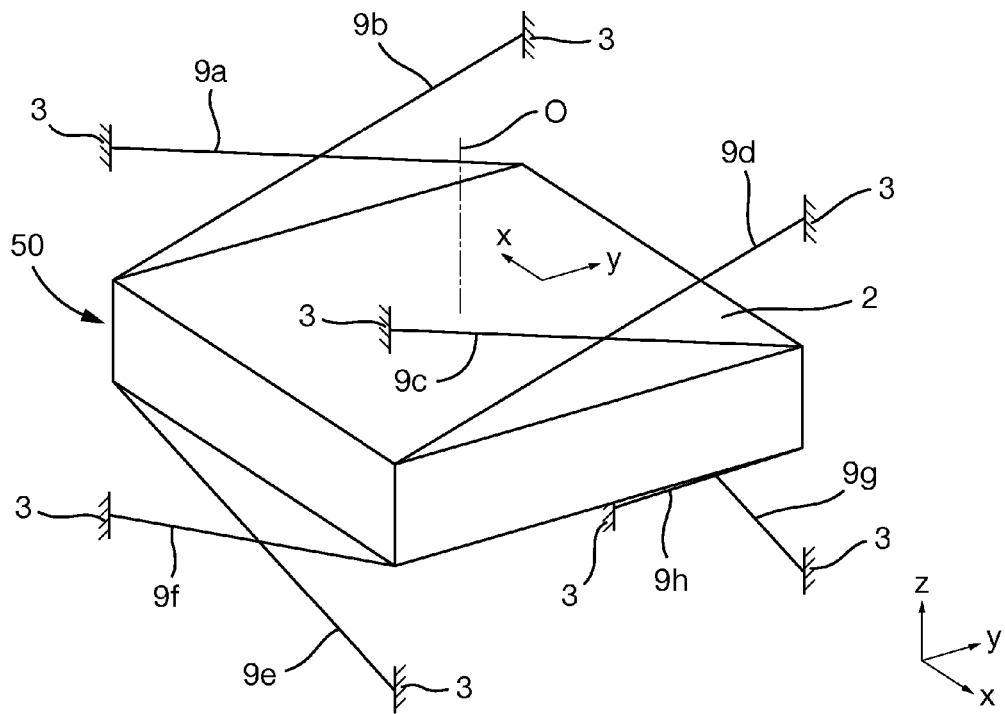
FIG. 8 is a perspective view of a third camera apparatus.

A third camera apparatus 50 is shown in FIG. 8 in which a total of eight SMA actuator wires 9a to 9h are connected between the lens element 2 and the support structure 3 in an arrangement as disclosed in more detail in WO-2011/104518 to which reference is made for a detailed description thereof. Accordingly, WO-2011/104518 is incorporated herein by reference. In particular, the SMA actuator wires 9a to 9h are inclined with respect to the optical axis O with a pair of the SMA actuator wires on each of four sides around the optical axis O arranged so that on contraction two groups of four SMA actuator wires 9a to 9d and 9e to 9h provide a force on the lens element 2 with a component in opposed directions along the optical axis O. The SMA actuator wires of each group are arranged with 2-fold rotational symmetry about the primary axis so that other groups of four SMA wires provide a force on the lens element 2 with a component in opposed directions along two axes X and Y orthogonal to the optical axis O. In this manner, the eight SMA actuator wires 9a to 9g can provide positional control of the movable element with multiple degrees of freedom.

The control system 11 of the third camera apparatus 50 is the same as the control system 11 of the second camera apparatus 30 as shown in FIG. 5 except that it is modified to provide positional control additionally along the optical axis O. Again, each one of the SMA actuator wires 9a to 9h is provided with an SMA circuit 12 that is arranged as described above. In one alternative, each SMA circuit 12 may be separately connected to its respective SMA actuator wire 9. In another alternative, the SMA actuator wires 9a to 9h have an interconnection at the movable element that electrically connects the group of SMA actuator wires together. In this alternative, the drive circuits 13 and detection circuits 13 of the SMA circuits 12 may be arranged to supply drive signals and to detect measures of resistance in the manner disclosed in WO-2012/066285, for example using the time-division multiplexing techniques disclosed therein.

The provision of positional control along the optical axis O involves similar modifications as made to the control system 11 of the second camera apparatus 20 shown in FIG. 7 as compared to the control system 11 of the first camera apparatus 1 shown in FIG. 2 to provide and use feedback difference measure ΔRacto and the target difference measure ΔRtargo additionally in respect of the optical axis. In this case, each one of the SMA actuator wires 9a to 9h is inclined at an acute angle to each of the axes O, X and Y. Accordingly, the control signals in respect of each one of the SMA actuator wires 9a to 9h is dependent on the two of the error signals Eo, Ex and Ey in respect of the two of the axes O, X and Y along which the SMA actuator wire in question applies a component of force. For example, the SMA actuator wire 9a applies components of force along the optical axis O and the axis Y, and so the control signal in respect of the SMA actuator wire 9a is dependent the error signal Eo in respect of the optical axis O and the error signal Ey in respect of the axis Y. In particular, each control signal includes components derived from the error signals Eo, Ex and Ey relatively scaled by factors whose magnitude represents the component of the force applied by the given SMA actuator wire 9 along the respective axes O, X and Y.

Figure 9:
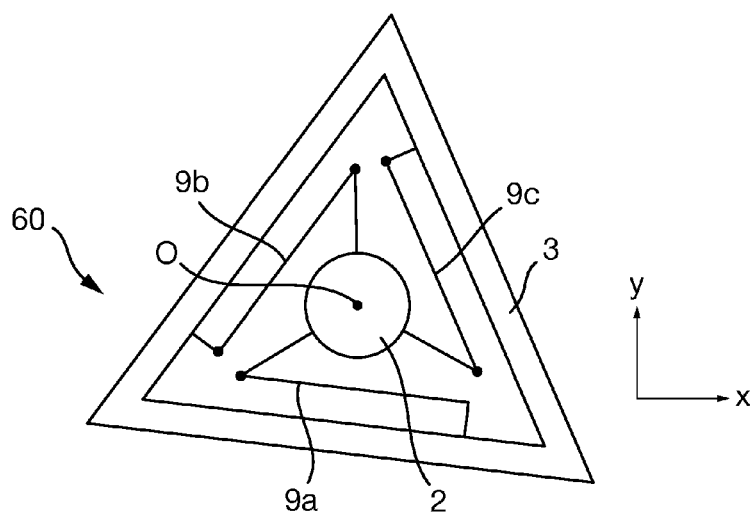
FIG. 9 is a plan view of a fourth camera apparatus.

A fourth camera apparatus 60 is shown in FIG. 9 in which a total of three SMA actuator wires 9a to 9c are connected between the lens element 2 and the support structure 3 in an arrangement in which the SMA actuator wires 9a to 9c lie in a common plane orthogonal to the optical axis O and with three-fold rotational symmetry. Thus, the SMA actuator wires 9a to 9c apply forces to the lens element 2 in opposed directions orthogonal to the optical axis O. Although none of the SMA actuator wires 9a to 9c are aligned, they still apply a stress to each other. One SMA actuator 9a is aligned with a first axis X perpendicular to the optical axis O. The other SMA actuators 9b and 9c are at acute angles to the first axis X and a second axis Y orthogonal to the first axis X, in particular acute angles of 60° and 30° respectively. Thus, the SMA actuators 9b and 9c are non-aligned actuators with respect to both axes X and Y.

As a result, all three SMA actuator wires 9a to 9c are capable on selective driving of moving the lens element 2 relative to the support structure 4 along the first axis X and the SMA actuator wires 9b and 9c are capable on selective driving of moving the lens element 2 relative to the support structure 4 along the second axis Y. Movement in other directions may be driven by a combination of actuation of these pairs of the SMA actuator wires 9a to 9c to provide a linear combination of movements along the first and second axes X and Y.

The control of the SMA actuator wires 9a to 9c is effected by the control system 11 which generates drive signals for each of the SMA actuator wires 9a to 9c. Movement is driven along the first axis X and the second axis Y which therefore are the predetermined axis and the further axis in this example.

The control system 11 of the fourth camera apparatus 60 is the same as the control system 11 of the second camera apparatus 20 as shown in FIG. 7 except for the following modifications.

As there are only three SMA actuator wires 9a to 9c, the fourth SMA circuit 12 is omitted. The remaining SMA circuits 12 supply the measures of resistance of each SMA actuator wire 9a to 9c to the difference measure circuit 16.

The difference measure circuit 16 derives a feedback difference measures ΔRactx and ΔRacty in respect of the two axes X and Y, each being the sum of the measures of resistance of each SMA actuator wire 9a to 9c scaled relative to each other by factors. As before, the magnitude of the factors represents the component along the axis in question of the force applied to the lens element 2, and the sign of the factors represents the direction along the axis in which the respective SMA actuator wire 9a, 9b or 9c applies that component of force. However, the factors have different values from the second camera apparatus 20 due to the different arrangement, as follows.

The first axis X is considered as follows. As the SMA actuator wire 9a is aligned along the first axis X and the other SMA actuators 9b and 9c are at acute angles to the first axis X, the magnitude of the factor for the SMA actuator wire 9a is one, whereas the magnitude of the factors for the other SMA actuators 9b and 9c are less than one, in fact being cos(60) since they represent the component of force applied along the first axis X. Similarly, the sign of the factor for the SMA actuator wire 9a is opposite to the sign of the factor for the other SMA actuators 9b and 9c. Therefore, the feedback difference measure ΔRactx in respect of the first axis X is a difference between the SMA actuator wire 9a and the sum of the resistances of the other SMA actuators 9b and 9c relatively scaled by cos(60).

The second axis Y is considered as follows. As the SMA actuator wire 9a is orthogonal to the second axis Y and the other SMA actuators 9b and 9c are at acute angles to the second axis Y, the magnitude of the factor for the SMA actuator wire 9a is zero, whereas the magnitude of the factors for the other SMA actuators 9b and 9c are less than one, in fact being cos(30) since they represent the component of force applied along the second axis Y. Similarly, the sign of the factor for the SMA actuator wire 9b is opposite to the sign of the factor for the other SMA actuators 9c. Therefore, the feedback difference measure ΔRacty in respect of the second axis Y is a difference between the SMA actuator wire 9b and the resistance of the other SMA actuator 9c each relatively scaled by cos(30).

The error signals Ex and Ey are supplied to the controller 18 which again generates a control signal for each of the SMA actuator wires 9a to 9c on the basis of the error signals Ex and Ey. The closed-loop control may be proportional, or may include differential and/or integral terms. The controller 18 supplies the control signals to the drive circuits 13 of each SMA circuit 12 where they are used to control the generated drive signals, as discussed above.

The controller 18 generates the control signals using a closed-loop control algorithm that reduces the error signals Ex and Ey. However, the manner in which the control signals are dependent on the error signals Ex and Ey is different from the second camera apparatus 20 due to the different physical arrangement, as follows. The control signals in respect of a given one of the SMA actuator wires 9a to 9c includes a component derived from each error signal Ex and Ey relatively scaled by factors whose magnitude represents the component of the force applied by the given one of the SMA actuator wires 9a to 9c along the respective one of the axes X and Y. Thus, the control signal applied to the SMA actuator wire 9a is dependent solely on the error signal Ex since it applies no component of force along the second axis Y. On the other hand, the control signals applied to each of the SMA actuators 9b and 9c includes a component dependent on the error signal Ex scaled by a first factor and a component dependent on the error signal Ex scaled by a second factor. The first factor represents the component of force applied along the first axis X and so is cos(60) and the second factor represents the component of force applied along the second axis Y and so is cos(30).

As in the control systems described above, control of the tension and temperature of the SMA actuator wires 9a to 9c may be performed independently of the positional control by varying the average power supplied to the SMA actuator wires 9a to 9c, for example by controlling the power source 15 to vary the power supplied to each drive circuit 13 to achieve predetermined tensions in the SMA actuator wires 9a to 9c.

The invention claimed is:

1. A method of controlling plural SMA actuator wires in an SMA actuation apparatus wherein the plural SMA actuator wires are connected in tension between a movable element and a support structure in an arrangement in which the plural SMA actuator wires apply forces to the movable element in opposed directions, being a method of controlling the SMA actuator wires to drive movement of the movable element relative to the support structure along a predetermined axis, the method comprising:
   detecting measures of the resistances of each of the plural SMA actuator wires;
   deriving a feedback difference measure in respect of the predetermined axis being the sum of the measures of resistance of each of the plural SMA actuator wires, scaled relative to each other by factors, in respect of each of the plural SMA actuator wires, the magnitude of which represents a component along the predetermined axis of a force applied by the SMA actuator wire to the movable element and the sign of which represents a direction along the predetermined axis in which the SMA actuator wire applies said component of force;
   controlling the powers of drive signals supplied to the plural SMA actuator wires that apply a component of force to the movable element along the predetermined axis in response to the feedback difference measure in a manner that reduces the difference between the feedback difference measure in respect of the predetermined axis and a target difference measure in respect of the predetermined axis.

2. A method according to claim 1, wherein said step of controlling the powers of drive signals supplied to the plural SMA actuator wires that apply a component of force to the movable element along the predetermined axis is performed in a manner that controls the average power of those drive signals to achieve predetermined tensions in the plural SMA actuator wires.

3. A method according to claim 1, further comprising obtaining a measure of ambient temperature, said step of controlling the powers of drive signals supplied to each of the plural SMA actuator wires that apply a component of force to the movable element along the predetermined axis being performed in a manner that controls the average power in response to the measure of ambient temperature.

4. A method according to claim 1, wherein said step of controlling the powers of drive signals supplied to the plural SMA actuator wires that apply a component of force to the movable element along the predetermined axis comprises adjusting the relative amounts by which the powers of the drive signals vary from an average power in response to the feedback difference measure in a manner that reduces the difference between the feedback difference measure in respect of the predetermined axis and a target difference measure in respect of the predetermined axis.

5. A method according to claim 1, wherein the plural SMA actuator wires consist of aligned SMA actuator wires that apply forces to the movable element in opposed directions along the predetermined axis, and optionally orthogonal SMA actuator wires that apply forces to the movable element orthogonal to the predetermined axis, so that said feedback difference measure in respect of the predetermined axis is the difference between the total resistance of any aligned SMA actuator wire that applies a force in a first one of said opposed directions and the total resistance of any aligned SMA actuator wire that applies a force in a second one of said opposed directions.

6. A method according to claim 1, wherein the plural SMA actuator wires comprise at least one non-aligned SMA actuator wire that applies forces to the movable element at an acute angle to the predetermined axis, so that said factor in respect of said at least one non-aligned SMA actuator wire has a magnitude less than one.

7. A method according to claim 1, being a method of controlling the plural SMA actuator wires to drive movement of the movable element relative to the support structure along a further axis orthogonal to the predetermined axis, in addition to said predetermined axis, the method further comprising:
   deriving a feedback difference measure in respect of the further axis being the sum of the measures of resistance of each of the plural SMA actuator wires, scaled relative to each other by factors, in respect of each of the plural SMA actuator wires, the magnitude of which represents a component along the further axis of a force applied by the SMA actuator wire to the movable element and the sign of which represents a direction along the further axis in which the SMA actuator wire applies said component of force;
   controlling the power of drive signals supplied to the plural SMA actuator wires that apply a component of force to the movable element along the further axis in response to the feedback difference measure in a manner that reduces the difference between the feedback difference measure in respect of the further axis and a target difference measure in respect of the further axis.

8. A method according to claim 7, wherein the plural SMA actuator wires consist of aligned SMA actuator wires that apply forces to the movable element in opposed directions along the predetermined axis, and orthogonal SMA actuator wires that apply forces to the movable element in opposed directions along the further axis, so that said feedback difference measure in respect of the predetermined axis is the difference between the total resistance of any aligned SMA actuator wire that applies a force in a first one of said opposed directions along the predetermined axis and the total resistance of any aligned SMA actuator wire that applies a force in a second one of said opposed directions along the predetermined axis, and so that said feedback difference measure in respect of the further axis is the difference between the total resistance of any orthogonal SMA actuator wire that applies a force in a first one of said opposed directions along the further axis and the total resistance of any aligned SMA actuator wire that applies a force in a second one of said opposed directions along the further axis.

9. A method according to claim 7, wherein the SMA actuation apparatus is a camera apparatus further comprising an image sensor fixed to the support structure, and the movable element comprises a camera lens element comprising one or more lenses arranged to focus an image on the image sensor, the predetermined axis and the further axis both being orthogonal to the optical axis of the camera lens element.

10. A method according to claim 9, wherein the at least one lens has a diameter of at most 10 mm.

11. A method according to claim 9, further comprising:
  generating vibration signals representative of the vibration of the apparatus; and
  generating said target difference measures in response to the vibration signals in a manner that drives the movement of the camera lens element to stabilise the image sensed by the image sensor.

12. A control system for an SMA actuation apparatus comprising a support structure, a movable element that is movable relative to the support structure and plural SMA actuator wires connected in tension between the movable element and the support structure in an arrangement in which the SMA actuator wires apply forces to the movable element in opposed directions, the control system comprising:
  a drive circuit operative to supply drive signals through the plural SMA actuators;
  a detection circuit arrange to detect measures of the resistances of each of the plural SMA actuator wires; and
  a control circuit configured to control the powers of the drive signals supplied by the drive circuit to drive movement of the movable element relative to the support structure along a predetermined axis,
  the control circuit being configured to derive a feedback difference measure in respect of the predetermined axis being the sum of the measures of resistance of each of the plural SMA actuator wires, scaled relative to each other by factors, in respect of each of the plural SMA actuator wires, the magnitude of which represents a component along the predetermined axis of a force applied by the SMA actuator wire to the movable element and the sign of which represents a direction along the predetermined axis in which the SMA actuator wire applies said component of force; and
  the control circuit being configured to control the powers of drive signals supplied to the plural SMA actuator wires that apply a component of force to the movable element along the predetermined axis in response to the feedback difference measure in a manner that the difference between the feedback difference measure in respect of the predetermined axis and a target difference measure in respect of the predetermined axis is reduced.

13. A control system according to claim 12, wherein the control circuit is configured to control the powers of drive signals supplied to the plural SMA actuator wires that apply a component of force to the movable element along the predetermined axis in a manner the average power of those drive signals is controlled to achieve predetermined tensions in the plural SMA actuator wires.

14. A control system according to claim 12, wherein the control system is arranged to obtain a measure of ambient temperature, and said step of controlling the powers of drive signals supplied to the plural SMA actuator wires that apply a component of force to the movable element along the predetermined axis is performed in a manner that controls the average power in response to the measure of ambient temperature.

15. A control system according to claim 12, wherein the control circuit is configured to control the powers of drive signals supplied to the plural SMA actuator wires that apply a component of force to the movable element along the predetermined axis by adjusting the relative amounts by which the powers of the drive signals vary from an average power in response to the feedback difference measure in a manner that the difference between the feedback difference measure in respect of the predetermined axis and a target difference measure in respect of the predetermined axis is reduced.

16. A control system according to claim 12, wherein the plural SMA actuator wires consist of aligned SMA actuator wires that apply forces to the movable element in opposed directions along the predetermined axis, and optionally orthogonal SMA actuator wires that apply forces to the movable element orthogonal to the predetermined axis, so that said feedback difference measure in respect of the predetermined axis is the difference between the total resistance of any aligned SMA actuator wire that applies a force in a first one of said opposed directions and the total resistance of any aligned SMA actuator wire that applies a force in a second one of said opposed directions.

17. A control system according to claim 12, the plural SMA actuator wires comprise at least one non-aligned SMA actuator wire that applies forces to the movable element at an acute angle to the predetermined axis, so that said factor in respect of said at least one non-aligned SMA actuator wire has a magnitude less than one.

18. A control system according to claim 12, wherein the control circuit is configured to control the powers of the drive signals supplied by the drive circuit to drive movement of the movable element relative to the support structure along a further axis orthogonal to the predetermined axis, in addition to said predetermined axis,
  the control circuit being configured to derive a feedback difference measure in respect of the further axis being the sum of the measures of resistance of each of the plural SMA actuator wires, scaled relative to each other by factors, in respect of each of the plural SMA actuator wires, the magnitude of which represents a component along the further axis of a force applied by the SMA actuator wire to the movable element and the sign of which represents a direction along the further axis in which the SMA actuator wire applies said component of force, and
  the control circuit being configured control to the power of drive signals supplied to the plural SMA actuator wires that apply a component of force to the movable element along the further axis in response to the feedback difference measure in a manner that the difference between the feedback difference measure in respect of the further axis and a target difference measure in respect of the further axis is reduced.

19. A control system according to claim 17, wherein the plural SMA actuator wires consist of aligned SMA actuator wires that apply forces to the movable element in opposed directions along the predetermined axis, and orthogonal SMA actuator wires that apply forces to the movable element in opposed directions along the further axis, so that said feedback difference measure in respect of the predetermined axis is the difference between the total resistance of any aligned SMA actuator wire that applies a force in a first one of said opposed directions along the predetermined axis and the total resistance of any aligned SMA actuator wire that applies a force in a second one of said opposed directions along the predetermined axis, and so that said feedback difference measure in respect of the further axis is the difference between the total resistance of any orthogonal SMA actuator wire that applies a force in a first one of said opposed directions along the further axis and the total resistance of any aligned SMA actuator wire that applies a force in a second one of said opposed directions along the further axis.

20. An SMA actuation apparatus comprising:
- a support structure;
- a movable element that is movable relative to the support structure and plural SMA actuator wires connected in tension between the movable element and the support structure in an arrangement in which the plural SMA actuator wires apply forces to the movable element in opposed directions; and
- a control system according to claim 12.

21. An SMA actuation apparatus according to claim 20, wherein the SMA actuation apparatus is a camera apparatus further comprising an image sensor fixed to the support structure, and the movable element comprises a camera lens element comprising one or more lenses arranged to focus an image on the image sensor, the predetermined axis and the further axis both being orthogonal to the optical axis of the camera lens element.

22. An SMA actuation apparatus according to claim 21, wherein the at least one lens has a diameter of at most 10 mm.

23. An SMA actuation apparatus according to claim 21, further comprising:
- a vibration sensor arranged to generate vibration signals representative of the vibration of the apparatus; and
- wherein the control circuit is configured to derive target difference measures in response to the vibration signals in a manner that drives the movement of the camera lens element to stabilise the image sensed by the image sensor.

* * * * *